US006447117B1

(12) United States Patent
Estrada et al.

(10) Patent No.: US 6,447,117 B1
(45) Date of Patent: Sep. 10, 2002

(54) EYEGLASS LENS MOUNTING SYSTEM

(76) Inventors: Rene Estrada, 401 W. Laveta, Apt. 12, Orange, CA (US) 92866; David Doan, 10522 Mast Ave., Garden Grove, CA (US) 92843

( * ) Notice: Subject to any disclaimer, the term of this patent is extended or adjusted under 35 U.S.C. 154(b) by 0 days.

(21) Appl. No.: 09/802,770

(22) Filed: Mar. 12, 2001

(51) Int. Cl.[7] .................................................. G02C 1/02
(52) U.S. Cl. ...................................... 351/110; 351/146
(58) Field of Search ................................. 351/110, 106, 351/140, 141, 145, 146, 149, 152, 154

(56) References Cited

U.S. PATENT DOCUMENTS

| 5,585,870 A | * 12/1996 | Masunaga .................... 351/106 |
| 6,007,200 A | * 12/1999 | Tachibana .................... 351/110 |
| 6,024,445 A | 2/2000 | Conner et al. ............... 351/110 |
| 6,250,755 B1 | * 6/2001 | Conner et al. ............... 351/110 |

* cited by examiner

Primary Examiner—Huy Mai
(74) Attorney, Agent, or Firm—Charles H. Thomas

(57) ABSTRACT

A pair of rimless eyeglasses are formed with lenses having mounting apertures defined through their structures near both their mutually proximate and mutually remote edges. The mounting wires and mounting apertures are of uniform cross section throughout between the inner and outer surfaces of the lenses. The ends of coupling wires at the bridge and temple pieces are bent back upon themselves to form mounting loops. The ends of the coupling wires at the mounting loops are inserted into the apertures in the lenses. The mounting wires are thereby secured in the apertures by the force of friction. Preferably each mounting aperture is lined with a resilient grommet that conforms to the shape of the aperture and at least partially conforms to the shape of the wire inserted therewithin. The grommets grip the wires and the structure of the lenses at the apertures to stabilize the bridge and temple pieces relative to be lenses.

14 Claims, 4 Drawing Sheets

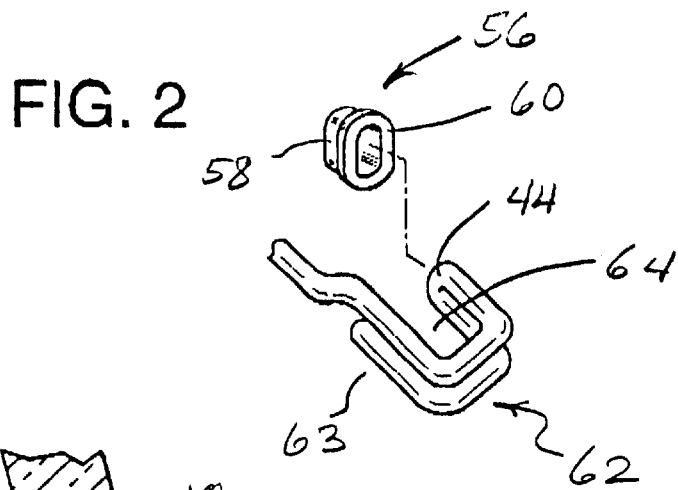
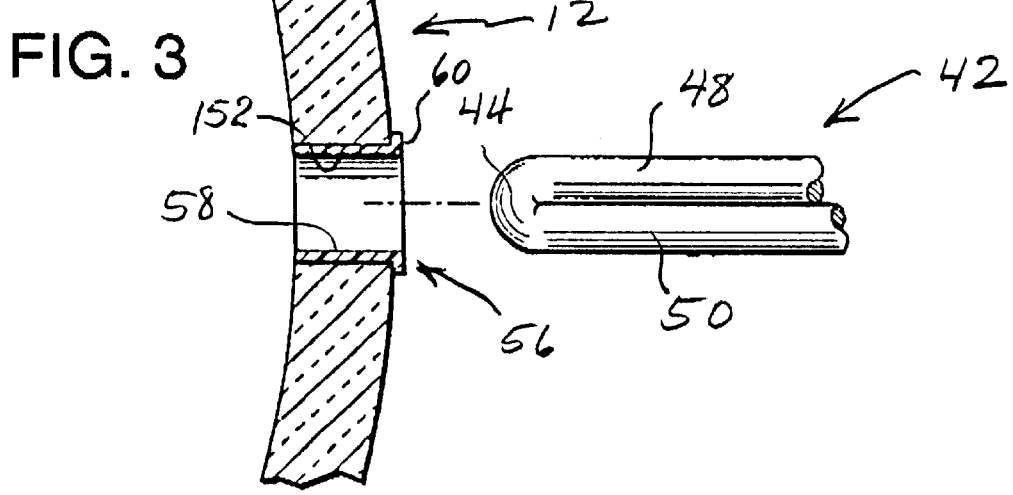
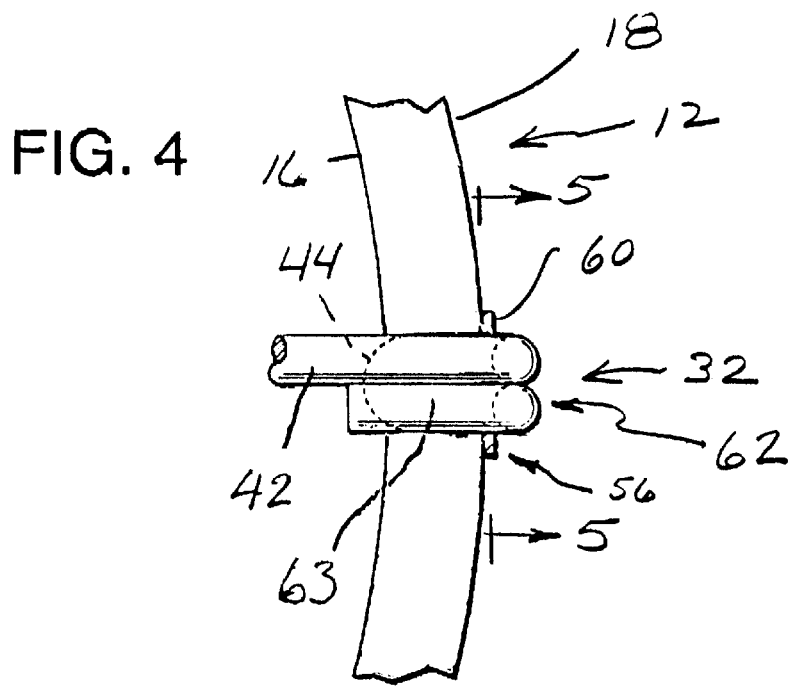

EYEGLASS LENS MOUNTING SYSTEM

BACKGROUND OF THE INVENTION

1. Field of the Invention

The present invention relates to a system for mounting rimless eyeglass frames to a nose bridge coupling and to temple pieces.

2. Description of the Prior Art

In some eyeglasses the eyeglass frames include rim structures that surround, or at least partially surround, the transparent lenses that are set side-by-side for positioning on either side of a person's nose. In such eyeglass frames there is typically a bridge portion that spans the bridge of a person's nose and which is integrally formed with the rims surrounding the eyeglass lenses. Temple pieces are then connected by hinge connections to the opposite sides of the rims on either side of the lenses.

However, another very popular style of eyeglass construction employes lenses that are not surrounded by rims. This type of eyeglass construction is popular with some people who object to the obstruction of their vision by the rims that are sometimes employed to surround the eyeglass lenses. Other people simply prefer the aesthetic appearance of rimless eyeglasses.

The construction of rimless eyeglasses presents certain structural problems. In eyeglasses with rims surrounding the lenses, the rims serve the function of providing a structural connection to both the bridge of the frame that spans the bridge of a person's nose and also to the temple pieces. In rimless eyeglasses, on the other hand, some other system for coupling the eyeglass lenses to each other on either side of a person's nose and also to the temple pieces must be employed.

One system that has been devised for this purpose is described in U.S. Pat. No. 6,024,445. In this system tapered apertures are defined through the structure of the lenses near both the mutually proximate and mutually remote edges of the lenses. The extremities of the bridge piece and the temple pieces are tapered in a corresponding manner and are inserted into the tapered apertures in the lenses to provide a friction lock therewith. While this system does achieve the objective of joining the lenses to each other by means of a bridge piece joining the lenses to temple pieces, it has significant disadvantages.

Tapered apertures through the lenses can be machined only with great care. A tapered drilling tool must be inserted into the structure of the lenses, but only to a depth that must be controlled within very fine tolerances. If the drilling tool penetrates too far, the aperture openings will be too large so that the bridge pieces and temple pieces will not be gripped tightly. If drilling penetration is too shallow, the aperture openings will be too small and will not permit complete insertion of the tapered ends of the bridge piece and the tapered ends of the temple connectors into the apertures. Furthermore, extra machining is required to create the tapered ends of the bridge piece and temple connectors. As a consequence, this system involves an inordinately large expense in eyeglass construction and is subject to production of a significant number of defective products.

SUMMARY OF THE INVENTION

The present invention provides a rimless eyeglass construction which easily and consistently creates a secure connection of the eyeglass lenses to the bridge piece and to both of the temple pieces. The system of the present invention does not require adherence to the very close machining tolerances characteristic of conventional rimless eyeglass connection systems, yet creates a more consistently secure coupling of the eyeglass lenses to the bridge and to the temple pieces.

In one broad aspect the present invention may be considered to be a connection between a rimless eyeglass lens and mounting apparatus for positioning the lens comprising: an aperture defined through the structure of the lens, and a wire of 5 uniform cross section on the mounting apparatus that is doubled back upon itself to form a loop. The wire is inserted into the aperture at the loop thereof and is secured therein by the force of friction.

In one preferred embodiment of the invention the aperture has a uniform cross section throughout and the loop of the wire is inserted through the aperture. The loop is formed of entry and reentry portions which preferably reside in direct contact with each other within the aperture. In this way a double thickness of the wire resides within the confines of the aperture. Preferably also a resilient, annular grommet is located within the aperture.

The wire is preferably formed of metal and passes through the grommet so that the grommet isolates the metal wire from direct contact with the lens. The grommet also exerts frictional forces against both the wire and the lens. The lens has inside and outside surfaces and the grommet preferably has a laterally projecting flange located on the outside surface of the lens. In a further preferred construction, the aperture is formed near the edge of the lens and the wire is bent to grip the structure of the lens between the aperture and the edge of the lens near which the aperture is located.

In another broad aspect the invention may be considered to be a mounting apparatus for rimless eyeglass lenses, each lens having an inner and an outer surface and mutually proximate and mutually remote mounting edges. The apparatus comprises mounting apertures formed through the lenses near at least some of the edges thereof, and at least one mounting wire having a uniform cross section doubled back upon itself to form mounting loops. The wire or plurality of wires is inserted into the mounting apertures at the mounting loops and secured therein by friction.

In still another aspect the invention may be considered to be an improvement in a rimless pair of eyeglasses employing a pair of transparent lenses, each having opposing inner and outer surfaces and having mutually proximate edges joined together at bridge couplings by a bridge and mutually remote edges joined to temple pieces at temple couplings. According to the improvement of the invention at least one of the couplings employs a wire doubled back upon itself to form a bent return loop. At least one of the lenses is perforated by an aperture of uniform cross section throughout between its inner and outer surfaces near at least one of the lens edges. The wire passes through the aperture at the bent return loop and is held anchored to the lens in the aperture by friction.

The invention may be described with greater clarity and particularity by reference to the accompanying drawings.

DESCRIPTION OF THE DRAWINGS

FIG. 2 is a perspective detail illustrating parts of the mounting connection system employed in the eyeglass construction illustrated in FIG. 1.

FIG. 3 is a side elevational detail, partially in section, illustrating the assembly of one connection in the eyeglass mounting apparatus employed in the eyeglasses of FIG. 1.

FIG. 4 is a side elevational detail illustrating the finished assembly of one eyeglass connection in the mounting apparatus employed in the eyeglasses of FIG. 1.

DESCRIPTION OF THE EMBODIMENT

Figure 1:
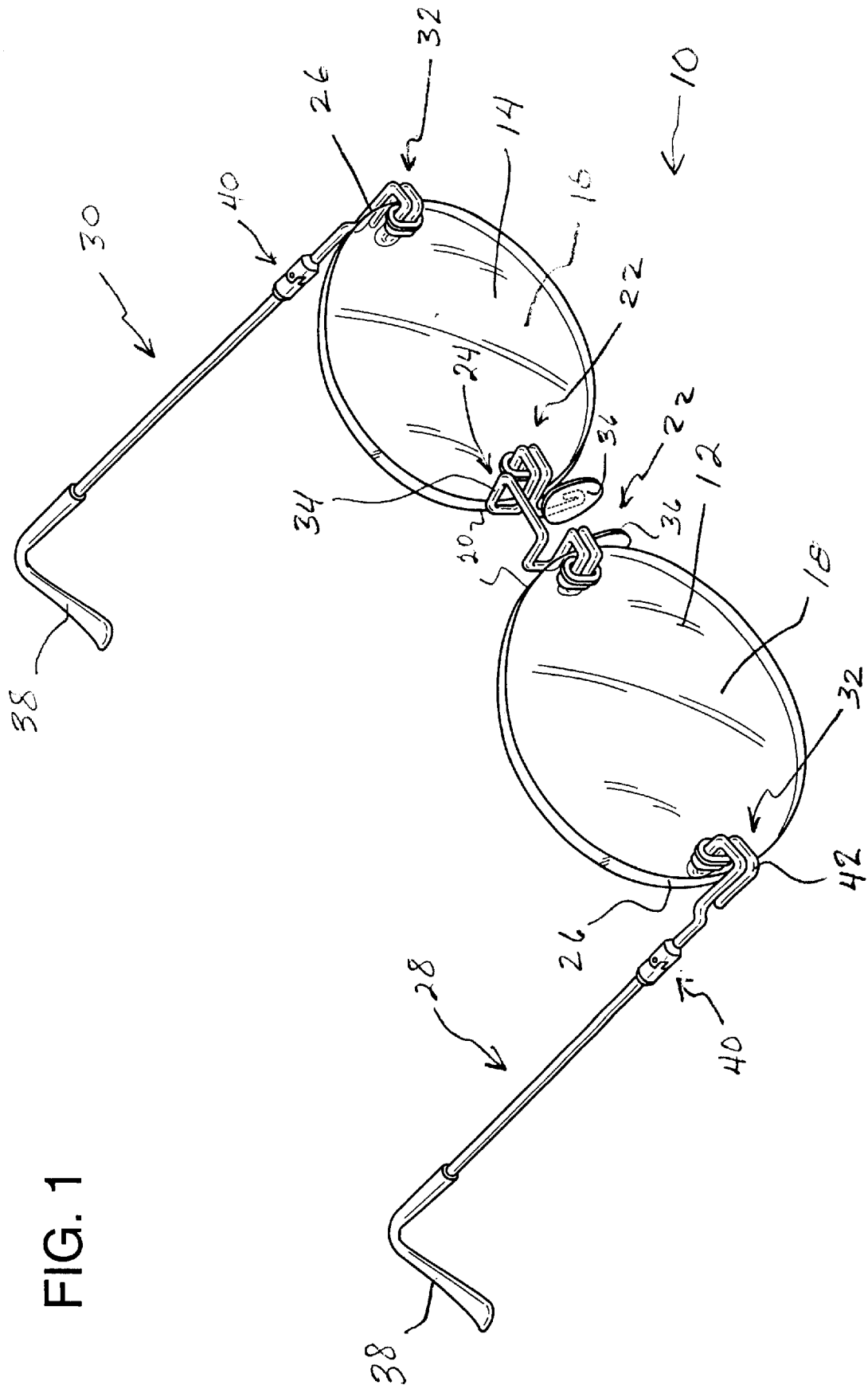
FIG. 1 is a perspective view of a rimless pair of eyeglasses constructed according to one embodiment of the invention.

FIG. 1 illustrates a rimless pair of eyeglasses indicated generally at 10 constructed according to one embodiment of the invention. The eyeglasses 10 employ a pair of transparent lenses 12 and 14, which may be constructed of either plastic or glass. Each of the lenses 12 and 14 has an inner surface 16 and an opposing outer surface 18, the directions "inner" and "outer" being considered with reference to the location of the lenses 12 and 14 relative to the eyes of a wearer. The lenses 12 and 14 have mutually proximate edges 20 joined together at bridge couplings 22 by a bridge 24 and mutually remote edges 26 joined to temple pieces 28 and 30 at temple couplings 32.

The bridge 24 is formed from a single length of wire 34 of uniform, circular cross section throughout that is bent as illustrated in FIG. 1. The tips of the extremities of the ends of the bridge wire 34 terminate in nose pads 36. The opposing ends of the bridge wire 34 adjacent the tips of the extremities thereof are both bent to form lens mounting connections according to the invention.

The temple pieces 28 and 30 are both bent at their free ends to form earengaging portions 38. Each of the temple pieces 28 and 30 has a hinge 40 that allows the temple pieces 28 and 30 to be folded together so that the eyeglasses 10 can fit into an eyeglass case. Each of the temple couplings 32 is formed of a single piece of wire 42 of uniform, circular cross section throughout, bent as illustrated. One end of each of the temple coupling wires 42 terminates at the hinge connection 40 of its associated temple piece.

The bridge couplings 22 and the temple couplings 32 are very similar in construction and can both be explained with reference to drawing FIGS. 2, 3, and 4. These drawing figures illustrate the temple coupling 32 at the right side temple piece 28 of the eyeglasses 10 in detail.

Figure 5:
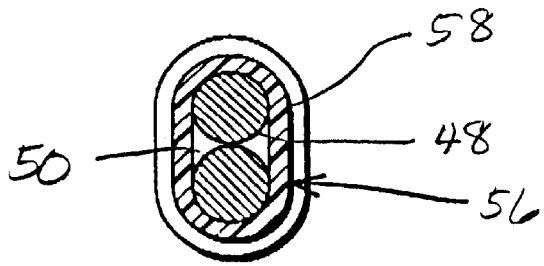
FIG. 5 is a sectional view taken along the lines 5—5 in FIG. 4.

Both the bridge wire 34 and the temple coupling wires 42 may be formed of beta-titanium or memo-flex titanium wire. The lens-engaging ends of the temple coupling wires 42 connected to the hinges 40 are bent to completely reverse longitudinal direction so that they are doubled back upon themselves to form mounting loops 44, illustrated in FIGS. 2, 3, and 4. The mounting loops 44 form one hundred eighty degree bends so that the wire is bent back upon itself to form entry and reentry sections 48 and 50, respectively. The wire 42 is bent so that the entry and reentry portions 48 and 50 reside in direct contact with each other, as illustrated in FIGS. 3, 4, and 5.

As illustrated in FIGS. 1 and 3, mounting apertures 52 are formed in the lenses 12 and 14 near the mutually proximate edges 20 thereof, as well as near the mutually remote edges 26 thereof. The lenses 12 and 14 may be formed of plastic polycarbonate or high-index to mid-index raw glass, which can be drilled before tempering. The mounting apertures 52 are formed by drilling and are of a uniform cross section throughout between the inner surfaces 16 and outer surfaces 18 of the lenses 12 and 14. Because the mounting apertures 52 in the lenses 12 and 14 must accommodate the double thickness of wire formed by the entry and reentry portions 48 and 50 at the loops 44, they are formed in a noncircular, oblong cross section having a vertical length about twice as great as the transverse width, as best illustrated in FIG. 5.

The mounting connections 22 and 32 also each include a resilient, annular grommet 56. The grommet 56 may be formed of a resilient, flexible, durable plastic or rubber. The grommet 56 has a tubular body portion 58, the outer surface of which conforms to the oblong shape of the mounting apertures 52. Each grommet 56 also has a flange 60 at its outer end that projects laterally in all directions from the tubular portion 58. The flange 60 covers an outer circumferential area that projects beyond the area of the tubular portion 58.

As best illustrated in FIG. 3, a grommet 56 is first inserted into each of the four mounting apertures 52 near the edges 20 and 26 of the lenses 12 and 14 with the laterally projecting flanges 60 residing in contact with the outer surfaces 18 of the lenses 12 and 14. The one hundred eighty degree bends 44 formed near the lens mounting ends of the temple coupling wires 42 and near both of the opposing ends of the bridge wire 34 are inserted from the outside surfaces 18 of the lenses 12 and 14 into the central openings in the tubular body portions 58 of the grommets 56. As shown in FIG. 3, both the entry portion 48 and the reentry portion 58 formed at the bends 44 of each mounting coupling 22 and 32 are inserted side-by-side into the mounting apertures 52 with the one hundred eighty degree bends 44 located at the inner surfaces 16 of the lenses 12 and 14. The wall thickness of the tubular portion 58 of the grommet 56 is such that the tubular portion 58 of each grommet 56 is resiliently compressed between the outer surfaces of the entry and reentry portions 48 and 50 of the temple coupling wires 42 and the bridge wire 34 and the interior surfaces of the lens apertures 52. As a consequence, the grommets 56 isolate the metal wires 34 and 42 from direct contact with the lenses 12 and 14 and exert frictional forces against the surfaces of contact with both the entry and reentry portions 48 and 50 of the wires 34 and 42.

As illustrated in FIG. 1, both of the temple coupling wires 42 have lens-engaging ends that are doubled back upon themselves to form the mounting loops with one hundred eighty degree bends 44. The bends 44 of the temple coupling wires 42 are inserted into separate ones of the mounting apertures 52, each near a separate one of the remote edges 26 of the lenses 12 and 14.

Similarly, loops formed with one hundred eighty degree bends 44 at both of the ends of the bridge wire 34 are inserted through the mounting apertures 52 located near the proximate edges 20 of the lenses 12 and 14. The tubular portions 58 of the grommets 56 define passageways therewithin. The resilient nature of the grommets 56 allows the wall structure of the tubular portions 58 thereof to at least partially conform to the outer surfaces of the entry and reentry portions 48 and 50 of the wires 34 and 42, as illustrated in FIG. 5. The wall structure of the tubular portions 58 of the grommet 56 are resiliently compressed between the mounting wires 34 and 42 and the structure of the lenses 12 and 14 surrounding the mounting apertures 52.

As best illustrated in FIG. 2, each of the wires 34 and 42 is bent into a square cornered, U-shaped configuration 62, the opposing sides of which define a gap 64 therebetween. The gap 64 has a width which is essentially equal to the thickness of the lens structure remaining between the lens edges 20 and 26 and the mounting apertures 52 located proximate thereto. The U-shaped portions 62 have leg portions 63 formed of a double thickness of wire opposite the leg portions formed by the entry and reentry wire portions 48 and 50. The leg portions 63 proximate the ends of the bridge wire 34 and the temple coupling wires 42 thereby grip the structure of the lenses 12 and 14 at the edges 20 and 26 thereof.

The mounting couplings 22 and 32 are significantly advantageous due to the double thickness of the wires 34 and 42 employed. By providing a double thickness of wire within the mounting apertures 52, the wires 34 and 42 will resist twisting within the mounting apertures 52. Furthermore, the double thickness of the entry and reentry wire portions 48 and 50 that press in contact with the lens edges 20 and 26 provide a relatively broad area of contact along the edges 20 and 26 that creates greater stability and aids in preventing the temple pieces 28 and 30 from rotating about their longitudinal axes. Although the wires 34 and 42 are relatively stiff, they do have a certain limited resiliency to provide a grip upon the structural portions of the lenses 12 and 14 between the mounting openings 52 and the lens edges 20 and 26. The lens connections 32 and 22 thereby form secure but very inexpensive and easily fabricated lens couplings.

Figure 6:
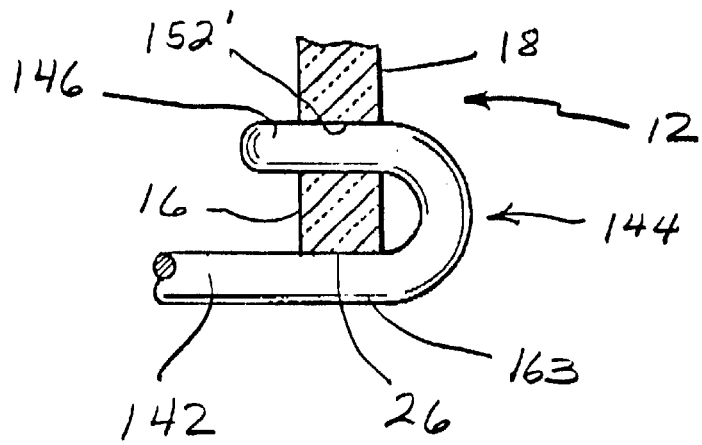
FIG. 6 is a sectional plan detail illustrating an alternative embodiment of an assembled rimless eyeglass connection according to the invention.

Other embodiments of the intervention are also possible. For example, FIG. 6 illustrates an embodiment of the invention in which a wire 142 of circular cross section is not bent back upon itself to form entry and reentry portions, but rather is bent into a U-shaped configuration forming a mounting loop in the shape of a rounded hook 144. The terminal end 146 of the single strand of wire 142 passes through a circular mounting aperture 152' near one of the edges 20 or 26 of the lenses 12 and 14. In the embodiment of FIG. 6 no grommet is employed and the diameter of the wire 142 is selected to fit snugly into the aperture 152. The back portion or leg 163 of the hook 144 passes around the edge 20 or 26 of the lenses 12 and 14 so that the leg portion 163 of the wire 142 forming the shank of the hook 144 grips the structure of the lens between the aperture 152' and the edge 20 or 26 to stabilize the orientation of the lenses 12 or 14 relative to the temple piece 28 or 30. Wires 142 having the configuration illustrated in FIG. 6 may be utilized at both ends of the bridge wire and at the lens coupling ends of the temple piece coupling wires.

Figure 7:
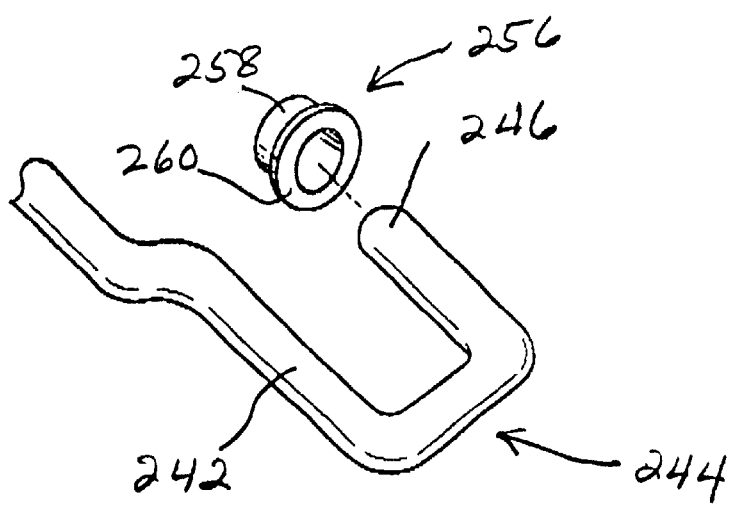
FIG. 7 is a perspective detail illustrating another alternative embodiment of a rimless eyeglass connection system according to the invention.

FIG. 7 illustrates a variation of this embodiment in which the wire 242 is bent into the shape of a hook 244, the legs 246 and 242 of which join the spine at right angles. The wire end forming the leg 246 is formed of a single strand of the wire 242. In the embodiment of FIG. 7 a cylindrical, annular grommet 256 is employed. The grommets 256 are formed of a resilient plastic or rubber and have cylindrical portions 258 that fit into and conform to the inner diameters of circular mounting apertures drilled through the structures of the lenses 12 and 14. Like the grommet 56, the grommet 256 has an annular radial flange 260 that resides in contact with the outer surface 18 of the lenses 12 and 14.

The rectilinear hook 244 forms a bend in the wire 242 that is located proximate the terminal end formed by the leg 246.

The rectilinear hook 244 grips the structure of the lens 12 or 14 into which its leg 246 is inserted adjacent the mounting aperture defined in that lens. The resilient, annular grommet 256 lines the mounting aperture of each lens 12 and 14 near the edges 20 and 26 thereof. The end 246 of the hook-shaped return loop 244 of the wire 242 is laterally encompassed and gripped by the grommet 256. The embodiments illustrated in FIGS. 6 and 7 are advantageous in that not only are the wires 142 and 242 formed in an easily fabricated circular cross section, but the mounting openings drilled through the lenses 12 and 14 have a circular cross section as well. The lens couplings illustrated in FIGS. 6 and 7 may thereby be fabricated easily and inexpensively.

Figure 8:
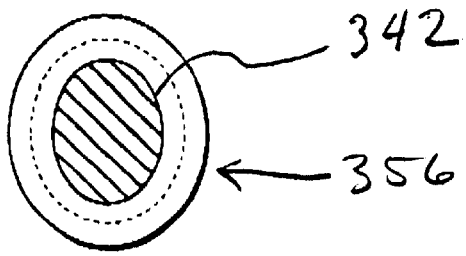
FIG. 8 is a transverse sectional detail of a modification of the rimless eyeglass connection shown in FIG. 7.

Other embodiments of the invention are also possible. FIG. 8 illustrates an embodiment similar in some respects to the embodiment of FIG. 7. However, the embodiment of FIG. 8 differs from that of FIG. 7 in that both the wire 342 and the grommet 356 have an elliptical cross-sectional shape. The noncircular, elliptical cross section of the wire 342 and the corresponding elliptical mounting openings in the lenses 12 and 14 serve to prevent the wire from twisting within the grommet 356 and within the openings defined through the lenses 12 and 14. In the embodiment of FIG. 8, both the bridge wire and the temple coupling wire may be formed in a noncircular cross section, rather than a circular cross section as with the wires 34, 42, 142 and 242 in the embodiments previously described.

Figure 9:
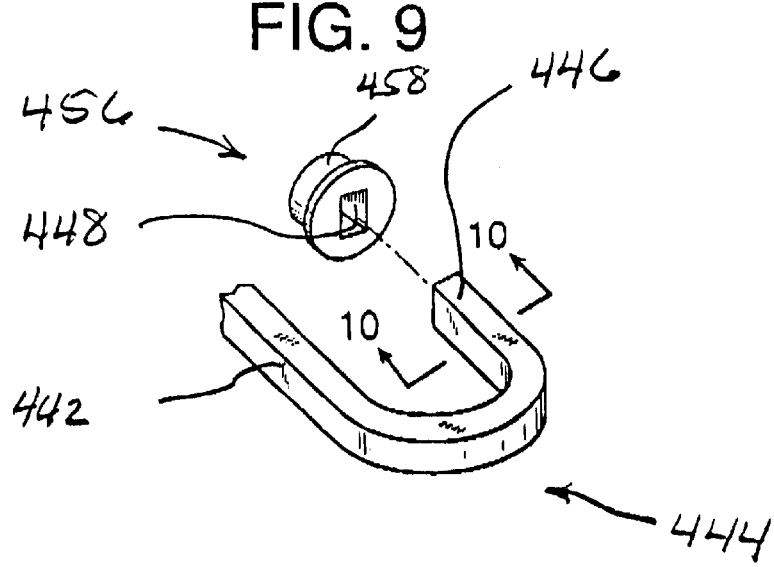
FIG. 9 is a perspective detail illustrating still another alternative embodiment of a rimless eyeglass connection system according to the invention.

FIG. 9 illustrates a coupling wire 442 which has an elongated, rectangular cross section. The wire 442 may also be substituted for the wires 34 and 42 and does not require a bend at the couplings to produce entry and reentry portions that reside in contact with each other. To the contrary, the wire 442 is bent into a rounded U-shaped loop 444. The end tip 446 of the mounting loop 444 is inserted through a central, rectangularly-shaped opening 448 in a grommet 456. A cylindrical, annular tubular portion 458 of the grommet 456 fits snugly into a circular mounting opening in the lens 12 or 14. The embodiment of FIG. 9 is advantageous because the tubular portion 458 of the grommet 456 fits into a mounting opening having a circular cross section, which is easily drilled into the structures of the lenses 12 and 14. The noncircular shape of the wire 442 is advantageous because it prevents the wire 442 from twisting relative to the lens to any significant degree. The structure of the grommet 456 is stiff enough to prevent the wire 242 from twisting within the opening 448.

Figure 10:
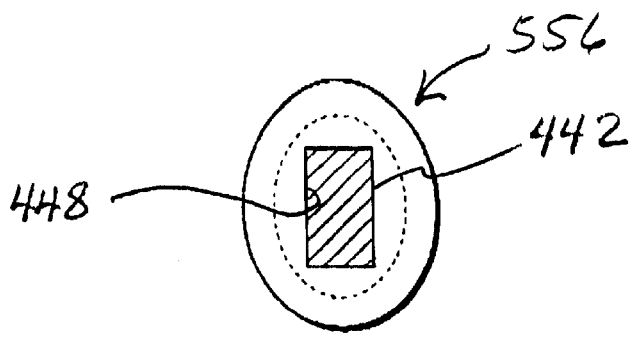
FIG. 10 is a transverse sectional detail of a modification of the rimless eyeglass connection shown in FIG. 9.

The embodiment of FIG. 10 employs the same wire 442 having a rectangular cross section as the embodiment of FIG. 9. However, the grommet 556 has an elliptical cross-sectional shape that fits into an elliptical mounting opening defined in the lens 12 or 14. While such elliptical openings are more difficult to form in the lenses, the embodiment of FIG. 10 is advantageous because the noncircular shape of the tubular portion of the grommet 556 prevents the grommet 556 from twisting within the mounting opening defined through the lens. The noncircular, rectangular shape of the wire 442 and the corresponding, rectangularly-shaped passageway 448 through the grommet 556 prevent the wire 442 from twisting within the passageway 448. The terminal end 446 of the return loop 444 of the wire 442 is laterally encompassed and gripped by the grommet 556.

Undoubtedly, numerous variations and modifications of the invention will become readily apparent to those familiar with the construction of rimless eyeglasses. Accordingly, the scope of the invention should not be construed as limited to the specific embodiments depicted and described, but rather is defined in the claims appended hereto.

We claim:

1. A connection between a rimless eyeglass lens having inner and outer surfaces and a peripheral edge and mounting apparatus for positioning said lens comprising:

an aperture defined through the structure of said lens near said peripheral edge and having a uniform cross section throughout, and a wire on said mounting apparatus of uniform cross section throughout its length that is bent to form a U-shaped section of a double thickness of said wire throughout and said wire is doubled back upon itself to define a loop that makes a 180 degree bend that is inserted into said lens from said outer surface thereof, said loop having entry and re-entry portions which reside in direct contact with each other on one side of said U-shaped section and which reside within said aperture, and said wire forms leg portions on the other side of said U-shaped section opposite said loop, and said leg portions reside in direct contact with each other throughout and also in direct contact with said peripheral edge of said lens, whereby said U-shaped section of said wire grips the structure of said lens between said aperture and said peripheral edge.

2. A connection according to claim 1, further comprising a resilient, annular grommet located within said aperture, and said wire is formed of metal and passes through said grommet so that said grommet isolates said metal wire from direct contact with said lens and exerts frictional forces against both said wire and said lens.

3. A connection according to claim 2 wherein said grommet has a laterally projecting flange located on said outer surface of said lens.

4. Mounting apparatus for a pair of rimless eyeglass lenses, each lens having an inner and an outer surface and mutually proximate and mutually remote peripheral mounting edges comprising: mounting apertures each having a uniform cross section throughout formed through said lenses near at least some of said mounting edges thereof, and at least one mounting wire having a uniform cross section throughout its length is doubled back upon itself in a 180 degree bend to form a U-shaped section of a double thickness of said at least one mounting wire throughout with a mounting loop formed of entry and re-entry portions that reside in direct contact with each other on one side of said U-shaped section and a pair of leg portions that reside in direct contact with each other on the other side of said U-shaped section, and said loop of said U-shaped section is inserted into one of said mounting apertures from an outer surface of one of said lenses and is held in frictional engagement in said one of said mounting apertures, whereby said U-shaped section grips the structure of said one of said lenses between said at least one aperture and the nearest of said peripheral mounting edges.

5. Mounting apparatus according to claim 4 wherein said mounting apertures are formed near said proximate mounting edges of both of said lenses and wherein said at least one mounting wire includes a bridge mounting wire having U-shaped sections and loops and a pair of leg portions as aforesaid at both of its ends and said ends of said bridge mounting wire are inserted through said mounting apertures near said proximate edges of both of said lenses.

6. Mounting apparatus according to claim 4 wherein said mounting apertures are formed near said remote edges of both of said lenses and further comprising a pair of mounting wires as aforesaid which are temple mounting wires, both of which have lens engaging ends doubled back upon themselves to form a U-shaped section, a mounting loop, and a pair of leg portions as aforesaid, and each of said lens engaging ends of said temple mounting wires is inserted into a separate one of said mounting apertures at a separate one of said remote mounting edges of said lenses.

7. Mounting apparatus according to claim 4 further comprising an annular grommet formed of a resilient material lining said at least one mounting aperture, and said mounting loop passes through said grommet within said at least one mounting aperture, whereby said grommet is frictionally engaged with said mounting loop and with said one of said lenses.

8. Mounting apparatus according to claim 7 wherein said aperture in said lens is of a uniform cross section throughout and said grommet has an outer circumferential surface that conforms to the shape of said at least one aperture and said grommet defines a passageway therewithin which receives said mounting loop.

9. Mounting apparatus according to claim 8 wherein said at lease one aperture has a noncircular cross section and said grommet at least partially conforms to the cross-sectional shape of the outer surfaces of said entry and reentry portions of said mounting loop.

10. Mounting apparatus according to claim 9 wherein said mounting aperture has a cross-sectional length about twice its width.

11. Mounting apparatus according to claim 4 further comprising a resilient, annular grommet disposed in said at least one mounting aperture, and said grommet has annular walls that are resiliently compressed between said at least one mounting wire and the structure of said one of said lenses surrounding said at least one mounting aperture.

12. Mounting apparatus according to claim 11 wherein said grommet has an annular flange residing in contact with said outer surface of said one of said lenses.

13. In a rimless pair of eyeglasses employing a pair of transparent lenses each having opposing inner and outer surfaces and having mutually proximate edges joined together at a bridge by bridge couplings and mutually remote edges joined to temple pieces at temple couplings, the improvement wherein at least one of said couplings employs a wire doubled back upon itself to form a U-shaped section with a bent return loop on one of its sides and a pair of gripping legs on the other of its sides, whereby said U-shaped section is formed of a doubled thickness of said wire throughout, and at least one of said lenses is perforated by an aperture of uniform cross section throughout between its inner and outer surfaces near at least one of said lens edges and said loop of said wire passes through said aperture from an outer surface of one of said lenses and is held anchored to said one of said lenses by friction and said legs of said U-shaped section reside in contact with each other throughout their lengths and in contact with said at least one of said lens edges, whereby said loop and said legs of said U-shaped section grip the structure of said one of said lenses therebetween.

14. A pair of rimless eyeglasses according to claim 13 further comprising a resilient, annular grommet lining said aperture and said return loop of said wire is laterally encompassed and gripped by said grommet.

* * * * *